United States Patent Office 3,236,900
Patented Feb. 22, 1966

3,236,900
DIALLYL ETHERS
Richard L. McConnell and Harry W. Coover, Jr., Kingsport, Tenn., assignors to Eastman Kodak Company, Rochester, N.Y., a corporation of New Jersey
No Drawing. Filed Mar. 7, 1961, Ser. No. 93,838
8 Claims. (Cl. 260—611)

This invention relates to new compositions of matter and to their preparation and more particularly to the provision of new diallyl ethers of saturated hydrocarbon glycols in which the hydroxy groups are separated by more than two carbon atoms including 2,2-dimethyl-1,3-propanediol (neopentyl glycol), 2,2,4-trimethyl-1,3-pentanediol, cis- or trans-1,3-cyclohexanedimethanol, cis- or trans-1,4-cyclohexanedimethanol, 2,2,4,4-tetramethyl-1,3-cyclobutanediol and 2,5-(or 6-)norcamphanedimethanol.

The production of various ethers by reacting allyl alcohol with dihydric alcohols is known. For example, it is known to prepare the diallyl ether of ethylene glycol by treatment of ethylene glycol with allyl bromide in the presence of excess 50% sodium hydroxide solutions [J. Am. Chem. Soc., 67, 46 (1945)] and also by treatment of ethylene glycol with allyl alcohol using a complex catalyst system consisting of cuprous chloride, ammonium chloride, hydrochloric acid and copper powder [Ann., 572, 23 (1951)].

It is also known from the disclosure of U.S. Patent 2,201,074 that diallyl ethers of diethylene glycol may be prepared by treatment of a di-haloalkyl ether with a metal salt of allyl alcohol. However, the ethers so prepared contain ether linkages within the hydrocarbon portion of the glycol, and this fact renders them quite chemically distinct from the ethers which are the subject of the present invention, as will be apparent hereinafter.

It is also known from the work of W. H. Watanabe, et al., J. Org. Chem., 23, 1666 (1958), to prepare monallyl ethers of mono-functional alcohols by treatment of a nontertiary alcohol with allyl alcohol in the presence of mercuric acetate and $BF_3$ etherate.

This invention has as its principal object to prepare diallyl ethers of saturated hydrocarbon glycols in which the hydroxy groups are separated by more than two carbon atoms.

Another object is to prepare diallyl ethers of 2,2-dimethyl-1,3-propanediol and 2,2,4-trimethyl-1,3-pentanediol.

It is also an object to prepare diallyl ethers of glycols containing a cyclic hydrocarbon ring such as cis- or trans-1,3-cyclohexanedimethanol, cis- or trans-1,4-cyclohexanedimethanol, 2,2,4,4-tetramethylcyclobutanediol and 2,5-(or 6-)norcamphanedimethanol.

Other objects will appear hereinafter.

These and other objects of the invention are accomplished, according to one embodiment thereof, by treating a saturated hydrocarbon glycol in which the hydroxy groups are separated by more than two carbon atoms with allyl alcohol or methallyl alcohol in the presence of mercuric acetate and $BF_3$ etherate. The reaction involved may be illustrated by the following equations:

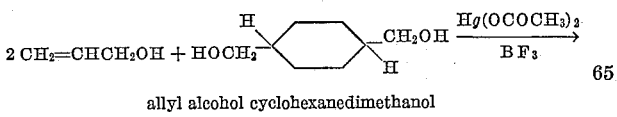

allyl alcohol cyclohexanedimethanol

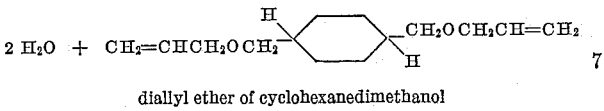

diallyl ether of cyclohexanedimethanol

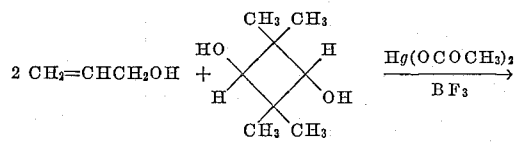

2,2,4,4-tetramethyl-1,3-cyclobutanediol

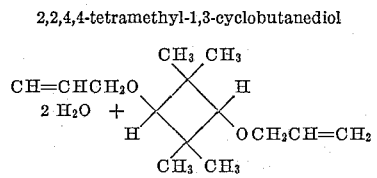

diallyl ether of 2,2,4,4-tetramethyl-1,3-cyclobutanediol

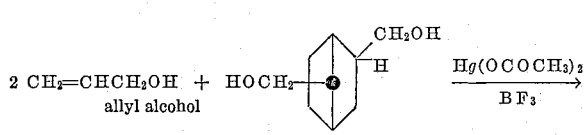

2,5-(or 6) norcamphanedimethanol

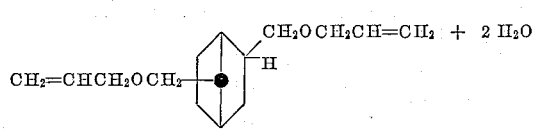

diallyl ether of 2,5-(or 6)norcamphanedimethanol

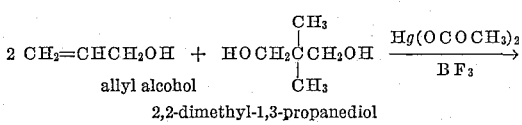

2,2-dimethyl-1,3-propanediol

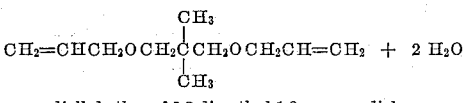

diallyl ether of 2,2-dimethyl-1,3-propanediol

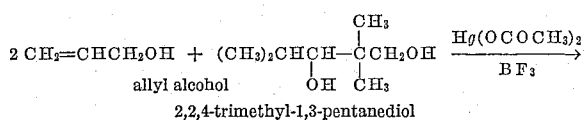

2,2,4-trimethyl-1,3-pentanediol

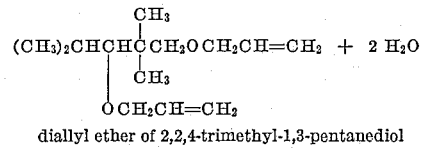

diallyl ether of 2,2,4-trimethyl-1,3-pentanediol

Water is liberated during the course of the etherification reaction and may be conveniently removed by employing benzene or other suitable solvents for azeotroping out the water from the reaction mixture. Reactions are conducted until the theoretical amount of water has been removed. This generally requires about 2 to 24 hours.

In the following examples and descriptions, we have set forth several of the preferred embodiments of our invention; but they are included merely for purposes of illustration and not as a limitation thereof.

*Example 1.—Preparation of 1,4-bis(allyloxymethyl)-cyclohexane*

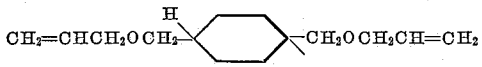

Trans-1,4-cyclohexanedimethanol (72.1 g., 0.5 mole), allyl alcohol (70.9 g., 1.2 mole), mercuric acetate (4.6 g., .04 mole), $BF_3$ etherate (1.5 g.), and 100 ml. of benzene were mixed and heated to reflux with stirring. After 2 hours refluxing, 15.5 ml. of water had been collected in a Dean-Stark tube. Another 4 g. of mercuric acetate and 1.5 g. of BF₃ etherate were added and the refluxing was continued. After 2 hrs., 4.5 ml. more water had been collected. The total reaction time was about 4 hours. The reaction mixture was distilled in vacuo through a 12 in. Vigreux column. The distillation range was 84–110° C. at 0.5 mm. This colorless distillate was washed 4 times with water, dried over sodium sulfate, and then fractionated through a 12 in. Vigreux column in vacuo. After removing the forerun (3 ml.), the product (60 g.) was collected at 94–95° C. at 0.8 mm., $n_D^{20}$ 1.4662. This material is essentially pure 1,4-bis(allyloxymethyl)cyclohexane; however, infrared and gas chromatographic analysis both indicate trace amounts of 1,4-cyclohexanedimethanol acetate. Similar results were obtained when a 30/70 mixture of cis- and trans-1,4-cyclohexanedimethanol was used.

*Example 2.—Preparation of 1,3-diallyloxy-2,2-dimethylpropane*

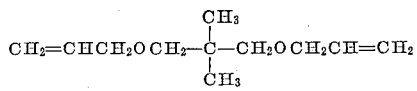

This compound was prepared from neopentyl glycol (104 g., 1 mole), allyl alcohol (139 g., 2.4 moles), mercuric acetate (9.2 g., .08 mole), BF₃ etherate (3 g.), and 100 ml. of benzene according to the general procedure described in Example 1. The yield was 120 g., B.P. 56–60° C. at 5–5.2 mm., $n_D^{20}$ 1.4332.

*Example 3.—Preparation of 1,3-diallyloxy-2,2,4,4-tetramethylcyclobutane*

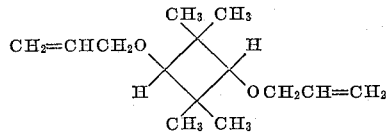

This diallyl ether was prepared from 2,2,4,4-tetramethyl-1,3-cyclobutanediol (144 g., 1 mole), allyl alcohol (139 g., 2.4 moles), mercuric acetate (9.2 g., .08 mole), BF₃ etherate (3 g.) and benzene (100 ml.) according to the general procedure described in Example 1. However, this glycol is much less reactive and the total reaction time required was about 20 hrs. and additional portions of the catalysts had to be added 3 times instead of one. A total of 33 ml. of water was collected. This product distills at 51–52° C. at 0.6 mm., $n_D^{20}$ 1.4473. The yield was 86 g.

*Example 4.—Preparation of 1,3-diallyloxy-2,2,4-trimethylpentane*

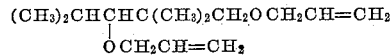

This diallyl ether was prepared from 2,2,4-trimethyl-1,3-pentanediol according to the procedure of Example 1.

*Example 5.—Preparation of 2,5-(or 6)bis(allyloxymethyl)-norcamphane*

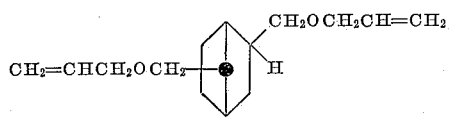

This diallyl ether was prepared from 2,5- (or 6-)norcamphanedimethanol according to the procedure of Example 1 except that toluene was used as the azeotroping agent.

*Example 6.—Preparation of 1,4-bis(methallyloxymethyl)cyclohexane*

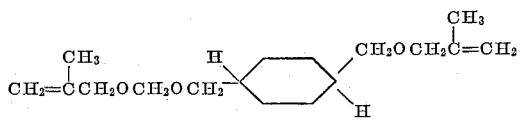

This compound was prepared from 1,4-cyclohexanedimethanol (72.1 g., .5 mole), methallyl alcohol (86.4 g., 1.2 mole), mercuric acetate (4.6 g., 0.04 mole), BF₃ etherate (1.5 g.) and 100 ml. of benzene according to the general procedure described in Example 1.

Within the broad scope of our invention and as indicated above, we may employ either allyl alcohol or a substituted compound, as, for example, methallyl alcohol as indicated in Example 6. By the term allyl ether as used herein and in the claims, it is to be understood that we refer to either the unsubstituted ether or a substituted type of compound, such as a methallyl ether.

In practicing the invention, the reaction, as indicated above, may be carried out within a temperature range of 20–200° C. at atmospheric, superatmospheric or subatmospheric pressures depending upon the specific method employed to remove the water formed in the etherification reaction. In general we prefer a temperature range of 50–125° C. at atmospheric pressure. When using an azeotropic water withdrawal agent, the particular temperature employed will of course depend upon the temperature at which a constant boiling mixture is formed between the water given off in the reaction and the water removing agent.

It will be noted from the above examples that we have illustrated our invention by reference to the use of the mercuric acetate-BF₃ etherate catalyst system. To the best of our knowledge and belief, the application of this particular catalyst system to the preparation of diallyl ethers of glycols is novel and has been found to be highly efficacious in the production of the new diallyl ethers of this invention. While we have illustrated our process by reference to mercuric acetate in this catalyst system, mercuric salts of other carboxylic acids such as mercuric propionate, mercuric butyrate, mercuric isobutyrate, etc., can also be employed.

It will be apparent to those skilled in the art that various modifications of the procedures for preparing the different diallyl ethers of the various glycols mentioned may be made within the scope of the invention. For example, the duration of the reaction may vary depending upon the particular reactants selected for the preparation of the desired diallyl ether compounds. It will, of course, be necessary in each case to continue the reaction until the reactions have gone to completion and the theoretical amount of water has been removed. While we have found it convenient to illustrate the process of preparing the new compounds of this invention by reference to the use of various azeotroping agents such as benzene and toluene, it will be evident that other suitable azeotroping agents may be employed. It is desirable to employ as the azeotroping agent a solvent for the reactants and for the product of the reaction since this insures intimate mixing of various reaction components. Alternatively and under suitable conditions, it will not be necessary to employ an azeotroping agent, as above described, and the water formed in the etherification reaction may be removed from the reaction mixture under carefully controlled conditions by simple distillation.

The new diallyl ethers of this invention may be identified as follows:

1,4-bis(allyloxymethyl)cyclohexane

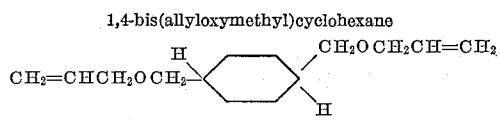

1,3-diallyloxy-2,2-dimethylpropane

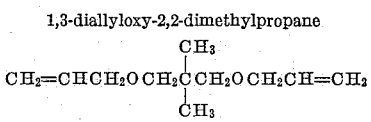

1,3-diallyloxy-2,2,4,4-tetramethylcyclobutane

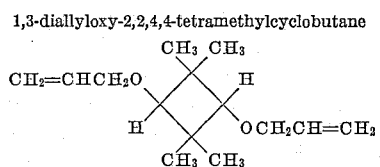

1,3-diallyloxy-2,2,4-trimethylpentane

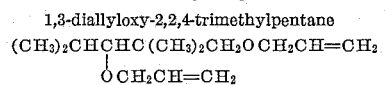
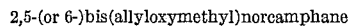

2,5-(or 6-)bis(allyloxymethyl)norcamphane

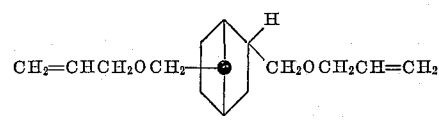

1,4-bis(methallyloxymethyl)cyclohexane

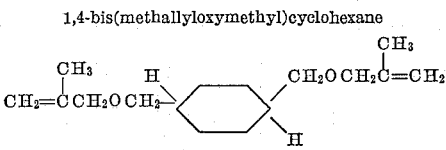

These compounds, by virtue of their particular chemical constitution, have been found especially useful in the preparation of diepoxides, and the diepoxides prepared from them are particularly suited for the preparation of epoxy resins having a high degree of toughness and flexibility. These compounds may also be used for the preparation of valuable copolymers. For example, they may be copolymerized with acrylonitrile, methyl methacrylate, ethyl acrylate, higher alkyl methacrylates, higher alkyl, acrylates, acrylamides such as acrylamide, N-methylacrylamide, N-isopropylacrylamide, N,N-dimethylacrylamide and N,N-diethylacrylamide, substituted acrylamides such as methacrylamide, N-methylmethacrylamide, N-isopropylmethacrylamide, N,N - dimethylmethacrylamide, and N,N-diethylmethacrylamide, vinyl acetate, vinyl chloride and vinylidene chloride over a wide range of compositions to produce valuable polymers. Furthermore, organophosphorus compounds such as dialkyl hydrogen phosphites and dialkyl phosphorothiolothionates may be added to the allyl groups of the diallyl ethers disclosed herein to provide organophosphorus compounds which are potentially valuable as pesticides and lubricating oil additives.

Although the invention has been described in considerable detail with reference to certain preferred embodiments thereof, variations and modifications can be effected within the spirit and scope of the invention as described hereinabove, and as defined in the appended claims.

We claim:

1. As a new composition of matter, a diallyl ether of a saturated hydrocarbon glycol selected from the group consisting of 2,2-dimethyl-1,3-propanediol, 2,2,4-trimethyl-1,3-pentanediol, cis-1,3-cyclohexanedimethanol, trans-1,3-cyclohexanedimethanol, cis-1,4-cyclohexanedimethanol, trans-1,4-cyclohexanedimethanol, 2,2,4,4-tetramethylcyclobutanediol, 2,5-norcamphanedimethanol and 2,6-norcamphanedimethanol.

2. As a new composition of matter, 1,4-bis(allyloxymethyl)-cyclohexane.

3. As a new composition of matter, 1,3-diallyloxy-2,2-dimethylpropane.

4. As a new composition of matter, 1,3-diallyloxy-2,2,4,4-tetramethylcyclobutane.

5. As a new composition of matter, 1,3-diallyloxy-2,2,4-trimethylpentane.

6. As a new composition of matter, 2,5-bis(allyloxymethyl)-norcamphane.

7. As a new composition of matter, 2,6-bis(allyloxymethyl)-norcamphane.

8. As a new composition of matter, 1,4-bis(methallyloxymethyl)cyclohexane.

References Cited by the Examiner
UNITED STATES PATENTS

| | | | |
|---|---|---|---|
| 2,042,219 | 5/1936 | Groll et al. | 260—615 |
| 2,201,074 | 5/1940 | Britton et al. | 260—615 |
| 2,426,863 | 9/1947 | Deebel | 260—615 |
| 2,579,515 | 12/1951 | Roach et al. | 260—615 |

OTHER REFERENCES

Watanabe et al., Jour. of Org. Chem., vol. 23 (1958), pages 1666–1668.

Nichols et al., Jour. Amer. Chem. Soc., volume 67 (1945), pages 46 to 49.

LEON ZITVER, *Primary Examiner.*